US008754316B2

(12) United States Patent
Shimizu

(10) Patent No.: US 8,754,316 B2
(45) Date of Patent: Jun. 17, 2014

(54) MUSICAL SOUND SIGNAL GENERATION APPARATUS

(75) Inventor: Masahiro Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 20 days.

(21) Appl. No.: 13/433,044

(22) Filed: Mar. 28, 2012

(65) Prior Publication Data

US 2012/0247306 A1 Oct. 4, 2012

(30) Foreign Application Priority Data

Mar. 28, 2011 (JP) ................................ 2011-069247

(51) Int. Cl.
*G01P 3/00* (2006.01)
*G10H 1/02* (2006.01)
*G10H 7/00* (2006.01)

(52) U.S. Cl.
USPC .............................................. 84/626; 84/662

(58) Field of Classification Search
USPC .......................................... 84/622, 626, 662
See application file for complete search history.

(56) References Cited

U.S. PATENT DOCUMENTS 5,247,129 A 9/1993 Nozaki et al.
5,304,734 A * 4/1994 Kunimoto ....................... 84/661
5,352,849 A * 10/1994 Kobayashi ...................... 84/659
5,648,629 A * 7/1997 Kozuki ........................... 84/660
5,744,743 A * 4/1998 De Poli et al. .................. 84/630
8,115,092 B2 * 2/2012 Tominaga ....................... 84/719
8,178,772 B2 * 5/2012 Iwase ............................. 84/661
2008/0245213 A1 * 10/2008 Izumisawa ...................... 84/604
2009/0031886 A1 * 2/2009 Iwase ............................. 84/661
2010/0307322 A1 * 12/2010 Tominaga ....................... 84/622
2012/0111178 A1 * 5/2012 Tominaga ....................... 84/622
2012/0240750 A1 * 9/2012 Kakishita ........................ 84/604

FOREIGN PATENT DOCUMENTS

JP 2-650509 B2 9/1997
JP 2-828872 B2 11/1998
JP 2-917609 B2 7/1999

* cited by examiner

*Primary Examiner* — Jeffrey Donels
(74) *Attorney, Agent, or Firm* — Morrison & Foerster LLP

(57) ABSTRACT

A string signal generator generates a string signal representing vibration of a string corresponding to a specified pitch in response to a note-on instruction such that the string signal rises and then attenuates in response to a note-off instruction. The string signal generator distributes the generated string signal to a plurality of loop circuits of a string resonance simulator. The plurality of the loop circuits correspond to a plurality of pitches and circulate resonant signals of the corresponding pitches, each loop circuit having a delay element for delaying the resonant signal by a time depending on the corresponding pitch, and an attenuation element for variably attenuating the resonant signal according to an attenuation coefficient. A controller respectively provides attenuation coefficients to the attenuation elements in the plurality of the loop circuits based on the note-on instruction, the note-off instruction, a damper-pedal-on instruction, and a damper-pedal-off instruction.

16 Claims, 11 Drawing Sheets

MUSICAL SOUND SIGNAL GENERATION APPARATUS

BACKGROUND OF THE INVENTION

1. Technical Field of the Invention

The present invention relates to a musical sound signal generation apparatus for generating musical sound signals of tones of a piano type musical instrument in response to a note-on instruction and a note-off instruction of a musical sound at a desired pitch, a damper-pedal-on instruction, and a damper-pedal-off instruction.

2. Description of the Related to Art

Attempts to electronically reproduce musical sounds generated from a natural musical instrument by simulating the action of the natural musical instrument have been made.

Among natural musical instruments, in a piano, for example, a sound is produced when a hammer strikes a string corresponding to a depressed key of a keyboard among a plurality of arranged strings, and releasing the key triggers a damper to come into contact with the string to suppress vibration of the string, thereby stopping the sound. When a certain string is struck, not only does the string generate a sound but neighboring strings resonate or the vibration of the string is propagated to other strings through a sound board to vibrate the other strings, and thus the other strings also generate sounds. This resonance or propagation of vibration is an important element of the characteristic sound of a piano. Meantime, a sustain pedal is known which separates dampers from all strings and prevents a damper from coming into contact with a string even when a key corresponding to the string is released.

Attempts to electronically reproduce the characteristic sound of a piano are disclosed in several Japanese Patent Publications.

Japanese Patent Publication No. 2828872 describes that a resonant sound generation channel is set for a string corresponding to each pitch, and a musical sound signal of a pitch corresponding to a depressed key, which is generated by a sound source, is input to the corresponding resonant sound generation channel so as to generate a resonant sound corresponding to the pitch. In addition, it is described that a resonant sound is generated only for a string from which a damper is released by controlling a coefficient for determining a level of a musical sound signal input to each resonant sound generation channel in response to a damper state determined according to on an on/off state of each key and an on/off state of the sustain pedal.

Japanese Patent Publication No. 2650509 discloses that a musical sound signal that simulates vibration of a string of a piano is input to a filter that simulates a propagation state of vibration from a bridge to a sound board in the piano, and a musical sound signal output from the filter or a musical sound signal before being filtered and the musical sound signal output from the filter are output as sound of a musical sound.

Japanese Patent Publication No. 2917609 describes that signals representing vibration states of strings corresponding to respective keys of an acoustic piano, a piano frame and a board support are stored in advance and when key depression is detected, signals indicating vibration states of the corresponding string, piano frame and board support are read according to information on the key depression (key number, hammer velocity, etc.) and supplied to a sound board driving section so as to drive a sound board, thereby generating a sound having the same tone as that of the acoustic piano.

In an acoustic piano, vibration is propagated from a certain string to another string via the air, a bridge, a frame, etc. This propagation is not affected by a damper state in each string (whether or not a damper comes into contact with a string).

Accordingly, the method of controlling a level of a musical sound signal input to each resonant sound generation channel according to a damper state, as described in Japanese Patent Publication No. 2828872, cannot correctly reflect the physical structure of the acoustic piano.

In addition, in the acoustic piano, vibration propagated from a certain string to another string is further propagated from another string to still another string. However, the method disclosed in Japanese Patent Publication No. 2828872 cannot reproduce propagation of vibration from another string of a propagation destination to still another string.

Japanese Patent Publication Nos. 2650509 and 2917609 do not describe a musical sound signal generation algorithm which solves the above problem.

SUMMARY OF THE INVENTION

The invention has been made in view of the above circumstances and it is an object of the invention to impart the same resonance effect as a string resonance effect based on the physical structure of an acoustic piano to a string signal generated by a sound source on the basis of a note-on instruction and a note-off instruction of a musical sound, a damper-pedal-on instruction, and a damper-pedal-off instruction.

To achieve the above object, the invention provides a musical sound signal generation apparatus comprising: a sound generation instruction section that supplies a note-on instruction of a pitch for instructing to start generation of a new musical sound signal at the pitch among a plurality of pitches and a note-off instruction of a pitch for instructing to accelerate decay of a musical sound signal, already generated at the pitch in response to a note-on instruction; a damper state instruction section that provides a damper-pedal-on instruction indicating an on-state of a damper pedal and a damper-pedal-off instruction indicating an off-state of the damper pedal; a string signal generator that generates a string signal corresponding to a string vibration of the pitch in response to the note-on instruction of the pitch such that amplitude of the string signal rises, then decays, and further decaying of the string signal is accelerated in response to the note-off instruction in case that the damper pedal is in the off-state, the string signal generator distributing the generated string signal in the form of a plurality of string signals corresponding to the plurality of the pitches; a string resonance simulator that is equipped with a plurality of loop circuits corresponding to the plurality of the pitches and through which resonant signals of the corresponding pitches circulate, each loop circuit comprising a delay element for delaying the resonant signal by a delay time for the corresponding pitch, and a attenuation element for variably attenuating the resonant signal according to a attenuation coefficient; a supply section that mixes the plurality of the string signals distributed from the string signal generator and the plurality of the resonant signals output from the plurality of the loop circuits to generate a plurality of loop input signals and supplies the plurality of loop input signals to each of the plurality of loop circuits; an output section that generates the musical sound signal based on the plurality of the resonant signals circulating through the plurality of the loop circuits and the plurality of the string signals distributed from the string signal generator; and a controller that generates attenuation coefficients corresponding to the plurality of loop circuits, based on the note-on instruction, the note-off instruction, the damper-pedal-on instruction, and the damper-pedal-off instruction, and provides the attenuation coefficients to the attenuating elements in the corresponding loop circuits.

In the musical sound signal generation apparatus, the controller may provide a first attenuation coefficient corresponding to a decay time of an undamped string sound to the attenuation element of the loop circuit of a pitch in response to the note-on instruction of the pitch, and then provide a second attenuation coefficient corresponding to a decay time of a damped string sound to the attenuation element of the loop circuit of a pitch in response to the note-off instruction of the pitch in case that the damper pedal is in the off-state, and otherwise provide the first attenuation coefficient to the attenuation element of the loop circuit of a pitch in response to the note-off instruction of the pitch in case that the damper pedal is in the on-state.

Alternatively, the controller may provide a first attenuation coefficient corresponding to a decay time of an undamped string sound to the attenuation element of the loop circuit of a pitch in response to the note-on instruction of the pitch, and then provide a second attenuation coefficient corresponding to a decay time of a damped string sound to the attenuation element of the loop circuit of a pitch in response to the note-off instruction of the pitch in case that the pitch is not higher than a predetermined pitch and the damper pedal is in the off-state, and otherwise provide the first attenuation coefficient to the attenuation element of the loop circuit of the pitch in response to the note-off instruction in case that the pitch is higher than the predetermined pitch or the damper pedal is in the on-state.

As described above, the musical sound signal generation apparatus according to the present invention can impart the same resonance effect as a string resonance effect based on the physical structure of an acoustic piano to a string signal generated by a sound source on the basis of a note-on instruction and a note-off instruction of a musical sound, a damper-pedal-on instruction, and a damper-pedal-off instruction.

DETAILED DESCRIPTION OF THE INVENTION

Embodiments for implementing the present invention will be explained in detail with reference to the attached drawings.

A description will be given of a musical sound signal generation apparatus that generates a musical sound waveform of a piano tone of one type on the basis of one piece of tone color data for facilitation of explanation of the invention. However, it is possible to prepare piano tone color data of a plurality of types and generate a musical sound waveform of a desired piano tone on the basis of tone color data selected from the prepared piano tone color data.

Figure 1:
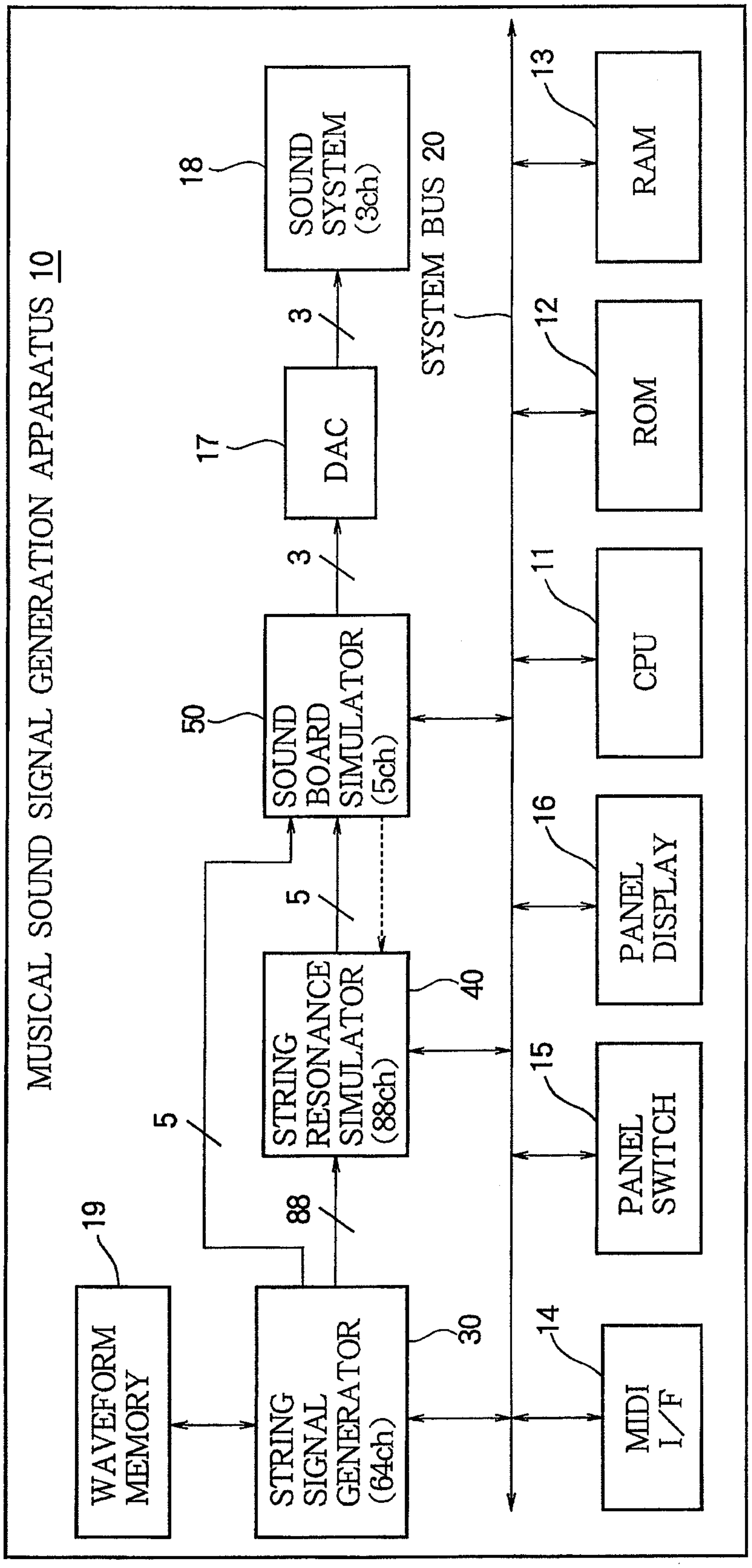
FIG. 1 illustrates a hardware configuration of a musical sound signal generation apparatus according to an embodiment of the invention.

FIG. 1 illustrates a hardware configuration of a musical sound signal generation apparatus 10 according to an embodiment of the present invention.

As shown in FIG. 1, the musical sound signal generation apparatus 10 may include a CPU 11, a ROM 12, a RAM 13, a MIDI I/F (interface) 14, a panel switch 15, a panel display 16, a string signal generator 30, a string resonance simulator 40, and a sound board simulator 50, which are connected through a system bus 20. In addition, the musical sound signal generation apparatus 10 includes a digital-to-analog converter (DAC) 17, a sound system 18, and a waveform memory 19.

The CPU 11 for controlling the overall operation of the musical sound signal generation apparatus 10 detects manipulation of the panel switch 15, controls display of the panel display 16, controls communication via the MIDI I/F 14, and generates and processes a musical sound signal in the string signal generator 30, the string resonance simulator 40 and the sound board simulator 50 on the basis of the one piece of tone color data by executing required control programs stored in the ROM 12 which is a machine readable storage medium.

The ROM 12 is a nonvolatile memory, which is a rewritable flash memory or the like, to store data which need not be frequently changed, such as control programs executed by the CPU 11, image data corresponding to images displayed on the panel display 16, data (the above-mentioned tone color data) of parameters set when a musical sound signal is generated and processed in the string signal generator 30, the string resonance simulator 40 and the sound board simulator 50, etc.

The RAM 13 is a memory used as a working memory of the CPU 11.

The MIDI I/F 14 is an interface for inputting/outputting MIDI data to/from an external device such as a MIDI sequencer.

The panel switch 15 is a manipulator such as a button, a knob, a slider, a touch panel, or the like provided on a manipulation panel and receives various instructions from a user, such as setting parameters, switching images and operation modes, etc.

The panel display 16 is implemented as a liquid crystal display (LCD), a light emitting diode (LED) display or the like and displays an operating state and set conditions of the musical sound signal generation apparatus 10, a message to the user, a graphical user interface (GUI) for receiving an instruction from the user, etc.

The string signal generator 30 detects a note-on instruction (note-on event) and a note-off instruction (note-off event) with respect to a musical sound of a desired pitch, a damper-pedal-on instruction indicating an on-state of a damper pedal, and a damper-pedal-off instruction indicating an off-state of a damper pedal, and generates a string signal corresponding to digital waveform data of a musical sound of a target pitch in response to a note-on instruction. The string signal which is generated to simulate vibration of a string corresponding to the target pitch in an acoustic piano (simply referred to as a piano hereinafter), on the basis of a plurality of parameters (string signal parameters) involved in generation of a string signal from among the tone color data. The string signal generated by the string signal generator 30 represents a sound generated by vibration of the string when a hammer strikes the string and barely contains components such as vibration of another string (resonance of another string) caused by propagation of vibration through a bridge and a pin, tone variation due to vibration of a sound board, etc. Waveform data corresponding to this sound is stored in the waveform memory 19 in advance. The string signal generator 30 reads out the waveform data, performs envelope processing on the waveform data and outputs the envelope-processed data.

The string resonance simulator 40 includes 88 resonators respectively corresponding to 88 sets of strings having lengths corresponding to the 88 pitches of a piano. In the piano, vibration generated in a string (string signal) is propagated to another string, and thus another string resonates to generate a resonant sound. The string resonance simulator 40 causes the string signal input from the string signal generator 30 to circulate through a resonator corresponding to the string on the basis of a plurality of parameters (string resonance parameters) involved in string resonance from among the tone color data, to thereby generate a resonant signal corresponding to resonant sound of the string. An input signal that induces a resonant signal of each resonator includes not only the string signal input from the string signal generator 30 but also a resonant signal generated by the string resonance simulator 40. Propagation of vibration from a target string to another string includes propagation through the air as well as propagation through a bridge and pin.

The sound board simulator 50 imparts acoustic effects (reverberation of a sound board) representing a tone variation in a sound propagated from a bridge in the piano, caused by vibration of the sound board, to an input musical sound signal on the basis of a plurality of parameters involved in resonance of the sound board from among the tone color data, and outputs the resulting waveform data. In the string signal generator 30 and the string resonance simulator 40 of the musical sound signal generation apparatus 10, vibrations caused by a sound generated by a string and applied to representative five points on bridges, which are involved in reverberation, are generated as 5-channel digital waveform data (musical sound signal), and variation in characteristics of the sound when the vibrations are propagated from the five points (excitation points of the sound board) to representative three points (sound-discharging points of the sound board) involved in discharge of sound on the sound board is reproduced by the sound board simulator 50.

The sound board simulator 50 outputs vibrations at the three points as 3-channel waveform data, and the DAC 17 converts the waveform data into an analog sound signal and drives 3-channel speakers of the sound system 18, which are arranged at three positions corresponding to the three points. In this manner, the musical sound signal generation apparatus 10 can generate a musical sound in which resonance of strings and reverberation caused by the sound board have been appropriately reflected in response to a note-on instruction and a note-off instruction with respect to a musical sound of a desired pitch, a damper-pedal-on instruction, and a damper-pedal-off instruction.

Information regarding a note-on instruction, pedal manipulation, etc. may be obtained in such a manner that a user manipulates manipulators such as a keyboard, a pedal and the like and the musical sound signal generation apparatus 10 detects such manipulation. Alternatively, the information may be obtained by reproducing previously stored music data (by generating a predetermined event at predetermined time according to the music data). Furthermore, the information may be acquired by receiving information regarding the manipulation or the event about the reproduced music data from the MIDI I/F 14.

Here, a conventional physical piano model sound source represents two phenomena, generation of a string waveform of each string and resonance of a plurality of strings, by calculations of string models of a plurality of strings like a piano that is a natural musical instrument. The musical sound signal generation apparatus 10 according to the current embodiment of the present invention is distinguished from the conventional physical piano model sound source in that blocks for implementing the two phenomena are separated from each other, generation of a string waveform of each string is performed by a waveform memory sound source (string waveform generator 30) and resonance of a plurality of strings is carried out by a resonance effecter (string resonance simulator 40).

A description will be given of detailed configurations of the string signal generator 30, the string resonance simulator 40 and the sound board simulator 50. Functions of these components may be implemented by dedicated hardware, software, or a combination thereof.

Figure 2:
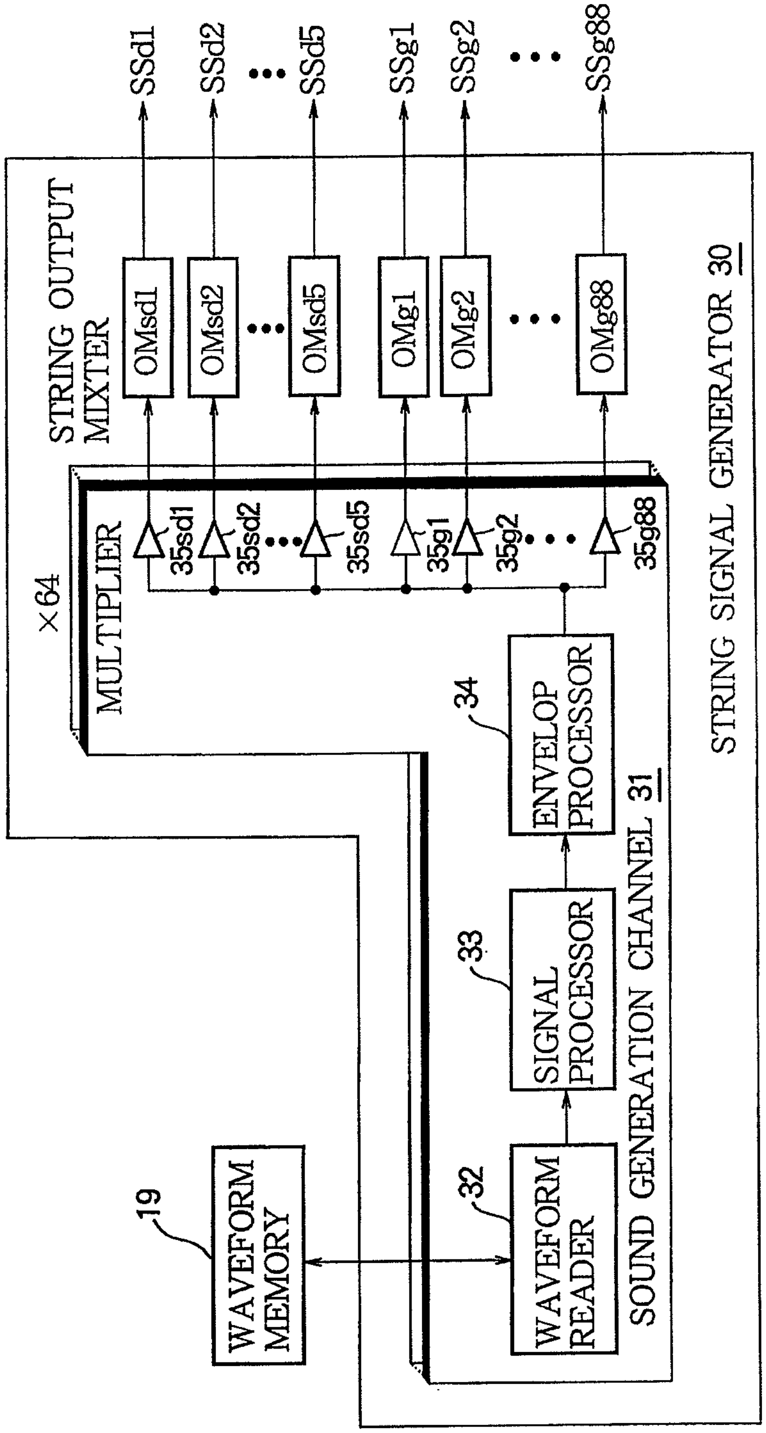
FIG. 2 illustrates a configuration of a string signal generator shown in FIG. 1.

FIG. 2 illustrates a configuration of the string signal generator 30.

As shown in FIG. 2, the string signal generator 30 includes 64 sound generation channels 31. These sound generation channels are assigned to generation of sound of a pitch (note number) involved in a note-on event upon detection of the note-on event. The string signal generator 30 generates a string signal of the corresponding pitch in the assigned sound generation channels. The above-mentioned note-on instruction (note-on event) includes a pitch (note number) and intensity (velocity) as parameters.

Each sound generation channel 31 includes a waveform reader 32, a signal processor 33, an envelope processor 34, and 93 multipliers 35 (35*sd*1 to 35*sd*5 and 35*g*1 to 35*g*88) corresponding to 93 outputs.

The waveform reader 32 reads out waveform data that is a basis of a string signal generated from a sound generation channel to which sound generation is assigned from the waveform memory 19 at every sampling interval on the basis of the string signal parameters while shifting a pitch of the waveform data such that the pitch corresponds to a pitch of the generated sound. The waveform memory 19 stores waveform data (vibration waveform) of a string sound, generated when one key of a piano is depressed with a given intensity, for each of a plurality of ranges (each range is composed of pitches corresponding to 3 to 10 consecutive keys) and for a plurality of intensities (for example, three levels of high, medium and low). The waveform reader 32 is configured to select one piece of waveform data corresponding to a pitch and intensity according to a note-on instruction from various waveform data on the basis of the string signal parameters and read out the selected waveform data. Sampling of a string vibration waveform stored in the waveform memory is performed using a special method as described blow such that resonance of other strings and reverberation of the sound board is not included in waveform data of an obtained string sound.

As described above, the string signal generator 30 comprises a waveform memory 19 that stores a plurality of waveforms, a waveform reader 32 that reads out a waveform corresponding to a pitch from the waveform memory in response to the note-on instruction of the pitch, and a processor 33 and 34 that controls at least one of a frequency characteristic and an amplitude characteristic of the read waveform according to the note-on instruction and the note-off instruction of the pitch to generate the string signal.

Figure 3:
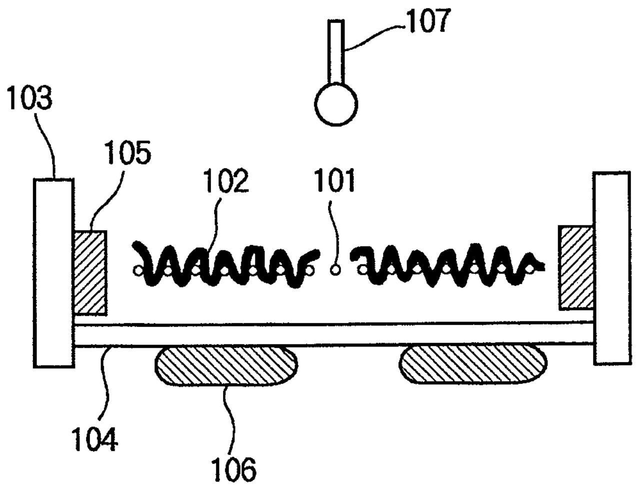
FIG. 3 illustrates a state of piano during waveform sampling.

FIG. 3 illustrates a state of piano during the above-mentioned sampling.

In FIG. 3, reference numeral 101 represents a string that generates a sound. Strings other than the string 101 are bound by felt cloth 102 to be prevented from vibrating. Damping gel 105 and 106 in sufficient mass is applied to a housing 103 and a sound board 104 so as to prevent the housing 103 and the sound board 104 from vibrating.

In this state, when a key of the keyboard, which corresponds to the string 101, is depressed such that a hammer strikes the string 101, resonance of other strings and vibration of the sound board do not occur although sound caused by vibration of the string 101 (and sound generated when the hammer strikes the string 101) is generated. Therefore, a microphone 107 collects this sound which attenuates this sound from a peak until it is not heard, then converts the suppressed sound into digital waveform data, and stores the digital waveform data, thereby acquiring waveform data of a pure string sound caused solely by vibration of the string 101, generated by a hammer's strike on the string 101 due to the strike energy. The waveform data barely contains resonance components of other strings and a reverberation component of the sound board.

The waveform memory 19 may store waveform data as described above for all the 88 strings of the piano. In this case, pitch shift is not needed.

Referring back to FIG. 2, the signal processor 33 performs filtering for imparting tone variation depending on the intensity (velocity) of key touch to the waveform data of the string sound, read out by the waveform reader 32, on the basis of the string signal parameters. According to this filtering, it is possible to generate waveform data of the string sound, which has an intensity different from the intensity of key depression when the string waveform is sampled, from waveform data of each string sound as a string signal.

The envelope processor 34 controls time variation in the amplitude of waveform data of each string sound on the basis of the string signal parameters. In a piano, the amplitude of a string sound increases when a hammer strikes the corresponding string according to key depression (attack state), and then is gradually damped at a predetermined decay rate (decay state). In case that a damper pedal is not depressed (pedal off-state), when the corresponding key is released, a damper depresses the corresponding string to accelerate damping so as to damp the amplitude of the string sound at a predetermined release rate (release state).

In case that the damper pedal is depressed (pedal-on-state), the damper is separated from the string even when the key is released and the decay rate is not different from that in the key depression state. When the damper pedal is released, the damper depresses the string, and thus the string signal is damped at a predetermined release rate (release state). Waveform data of each string sound read from the waveform memory 19 is full waveform data and has a volume variation from an attack state to a decay state. Accordingly, the envelope processor 34 controls the amplitude of waveform data of a string sound at a predetermined amplitude envelope (volume level) and does not control time variation of the waveform data if the waveform data of the string sound is maintained between an attack state and a decay state after the string sound is instructed to be generated. After the string sound is instructed to be suppressed, the envelope processor 34 continues to control the amplitude of the waveform data according to the amplitude envelope if the decay state is maintained and controls the amplitude of the waveform data of the string sound according to an amplitude envelope that is damped at a predetermined rate when the decay state is transited to a release state.

In natural musical instruments equipped with strings, reducing a decay time of vibration generated in a string when the string is depressed by a damper, a finger of a person or other members is called "damping".

In the case of a piano, a decay time (corresponding to a decay rate) from 80 dB (decibel) to 40 dB in an undamped string is several to tens seconds. The decay time is longer in a lower range and decreases as the range increases. Further, a decay time (corresponding to the release rate) of a damped string is shorter than one second and it is longer in a lower range.

In view of this, a damper may not be provided to strings in a high pitch range. The damper is generally provided in low ranges from first to sixty-sixth or first to seventy-second strings. For strings that are not equipped with dampers, damping is not accelerated even if keys are released in a damper pedal off-state. Since the number of strings equipped with dampers may vary from one model to the next, even when such models are manufactured by the same company, this border key number may be set by a user as a tone color parameter.

The envelope processor 34 controls the amplitude of waveform data of a string sound, which is read from the waveform memory 19 in response to a sound generating instruction (the note-on instruction) for a certain string signal, at a predetermined amplitude envelope (volume level) depending on intensity (velocity). Upon reception of a sound silencing instruction (note-off instruction) for the string signal, the envelope processor 34 controls the amplitude of the waveform data of the string sound at an amplitude envelope that is damped at a predetermined rate (corresponding to the difference between the release rate and the decay rate) in a damper pedal off-state and controls the amplitude of the waveform data at a time-invariant amplitude envelope (equal to the amplitude envelope so far) in a damper pedal on-state. The volume envelope (volume level) of a sound generation channel in which the amplitude of waveform data (string signal) of a string sound output from the string signal generator 30 has been sufficiently damped such that the string sound is not heard is set to 0 ($-\infty$ dB) in the envelope processor until the next note-on instruction is provided to the sound generation channel, and thus mute waveform data is output.

In the present invention, a string having a decay time longer than several seconds is defined as an 'undamped string' and a string having a decay time shorter than one second is defined as a 'damped string' (while the description is made using a piano as an example in the embodiment, the present invention is not limited to pianos).

The multiplier 35 multiplies the waveform data processed by the envelope processor 34 by a predetermined coefficient depending on how much the generated string signal affects output destinations. The output destinations include inputs SSd1 to SSd5 corresponding to the five points (excitation points of the sound board) on the bridges in the sound board simulator 50 and inputs SSg1 to SSg88 of a resonator 41 corresponding to each resonant loop in the string resonance simulator 40.

The distribution coefficient set to each multiplier 35 is determined in advance according to the influence of a string corresponding to a target pitch associated to the generated string signal on vibrations at the five points (excitation points of the sound board) on the bridges and according to the influence on vibrations of other strings (resonators) and stored in the ROM 12 as a string signal parameter. For example, a multiplication coefficient for each bridge can be determined such that the influence of the string on a point on a bridge to which the string is directly fixed is larger than the influence on a point on a bridge to which the string is not directly fixed, and the influence increases as a distance between the string and a target point decreases. Coefficients for strings can be determined such that a distribution coefficient for a string physically close to the string associated to the generated string signal is larger than others and a distribution coefficient for a string fixed to the same bridge to which the string is fixed is larger than others. Further, since resonance of the string corresponding to the target pitch associated to the generated string signal is included in the waveform data of the string sound generated by the string sound generator 30, the distribution coefficient for this string is set to 0 (−∞ dB which means that sound is not output).

Namely, the string signal generator 30 controls level of the string signal with a plurality of first distribution coefficients to generate the plurality of string signals corresponding to the pitches, and distributes the plurality of string signals to a supply section in the form of resonance input mixers IMg1-IMg88, and the supply section mixes the plurality of string signals corresponding to the pitches with the resonant signals from the string resonance simulator 40 to generate the plurality of loop input signals corresponding to the pitches.

The coefficients depend on pitches assigned to the sound generation channels 31. Accordingly, distribution coefficients corresponding to a pitch at a time when the sound generation channel 31 is assigned to generate the pitch is set to the multiplier 35.

The string signal generator 30 includes string output mixers OMsd1 to OMsd5 and OMg1 to OMg88 which mix all string signals output from the 64 sound generation channels 31 (only sound generation channels which are generating sounds in practice) and output the mixed signals to output destinations.

The string signal generator 30 can output waveform data of a musical sound generated when a hammer strikes a string to the string resonance simulator 40 and the sound board simulator 50 according to the aforementioned configuration. When a plurality of strings simultaneously generate musical sounds according to a plurality of depressed keys, the string signal generator 30 can output waveform data obtained by mixing the musical sounds.

Figure 4:
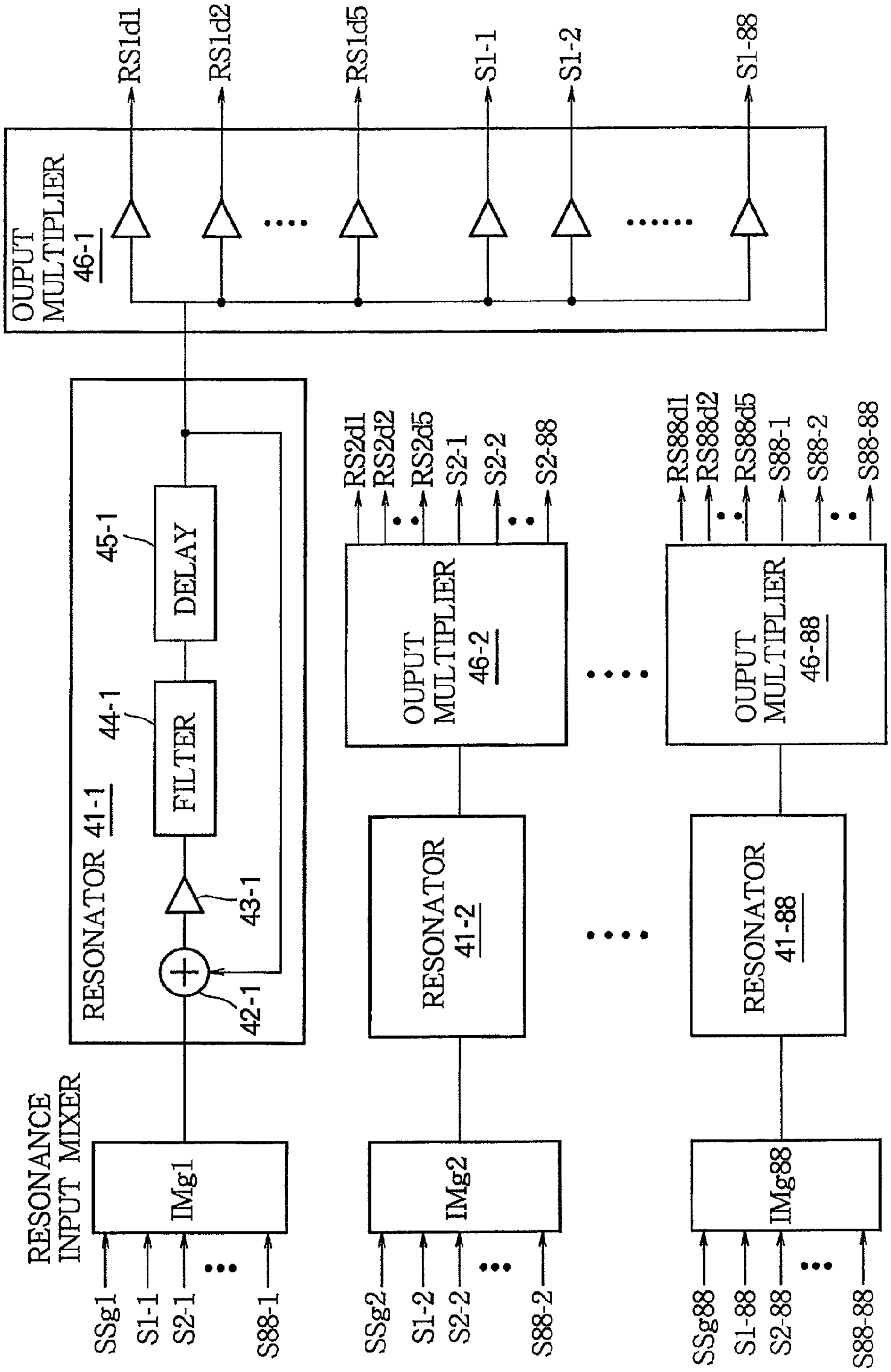
FIG. 4 illustrates a configuration of part of a string resonance simulator shown in FIG. 1.
Figure 5:
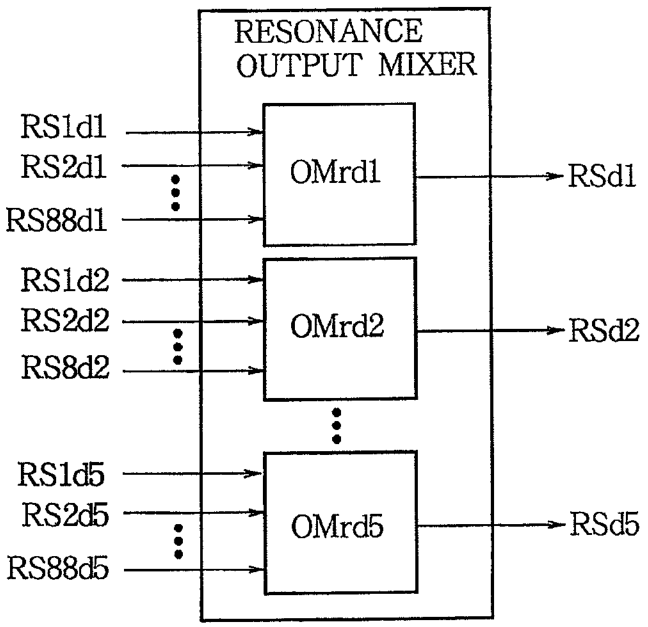
FIG. 5 illustrates a configuration of another part of the string resonance simulator.

FIGS. 4 and 5 illustrate the configuration of the string resonance simulator 40.

As shown in FIG. 4, the string resonance simulator 40 includes 88 resonators 41 (41-1 to 41-88) respectively corresponding to the 88 strings of the piano, resonance input mixers IMg1 to IMg88 respectively arranged in a preceding stage of the resonators 41, and output multipliers 46 (46-1 to 46-88) respectively arranged following the resonators 41.

Each resonator 41 includes an adder 42, a multiplier 43, a filter 44, and a delay 45 (in FIG. 4, '-1' is affixed to reference numerals which denote components of the resonator 41-1)

A loop circuit is configured in such a manner that the adder 42 sums an input from the corresponding resonance input mixer and an output of the delay 45. Here, a delay amount set in the delay 45 corresponds to a time in response to the pitch of the string corresponding to the resonator 41 and is determined such that the output of the delay 45 is added to an input waveform after one period of the pitch at the adder 42 in consideration of delays in the adder 42, the multiplier 43 and the filter 44. Therefore, the frequency component of the pitch of the string corresponding to the resonator 41 in the input waveform applied to the resonator 41 can be emphasized according to the looping so as to reproduce a resonant sound of the pitch.

The multiplier 43 is configured to simulate damping of vibration in the corresponding string and multiplies input waveform data by a set attenuation coefficient. Different attenuation coefficients are set to the multiplier 43 in real time in response to damper states, an on-state in which the damper depresses the string (on) and an off-state in which the damper is released (off). The attenuation coefficient when the damper is released is greater than the attenuation coefficient when the damper depresses the string (vibration in the string is more difficult to damp when the damper is released).

Here, even when the same attenuation coefficient is set to the multiplier 43, low-range sound is difficult to damp since it has a small number of loops per unit time (since the delay in the delay 45 is large). Vibration in an actual string requires a time to damp in case of low-range sound, as described above. In view of this, it is desirable to prepare different attenuation coefficients depending on pitches such that decay time in a string in a low pitch range is made comparative or similar to decay time in a string in a high pitch range, and the attenuation coefficients may be finely adjusted such that decay time gradually increases as a sound range becomes low as in strings of the piano.

A value depending on a damper on/off state is not directly set as an attenuation coefficient of the multiplier 43, and a configuration for preventing abrupt variation in the value is preferably provided in order to prevent generation of noise.

Figure 6:
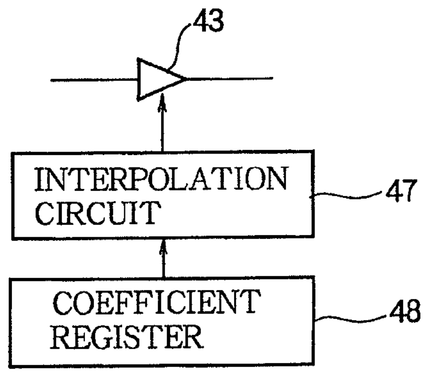
FIG. 6 is a diagram illustrating setting of a parameter to a multiplier 43 shown in FIG. 4.
Figure 7:
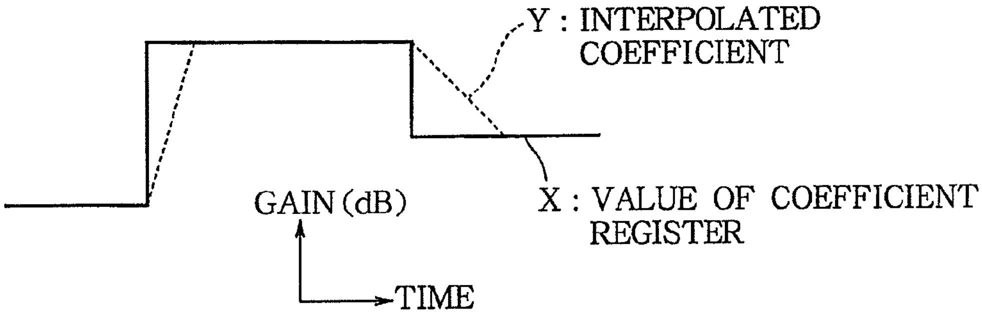
FIG. 7 is a diagram illustrating interpolation by an interpolation circuit 47 shown in FIG. 6.

As shown in FIGS. 6 and 7, a value depending on a damper on/off state is set to a coefficient register 48 in real time first, and when the value of the coefficient register 48 is changed, an interpolation circuit 47 gradually reflects the change in the attenuation coefficient of the multiplier 43. Namely, a controller of the apparatus smoothly changes the attenuation coefficient to avoid noise when the damper pedal switches between the on-state and the off-state.

In the current embodiment of the invention, the value of the coefficient register has three values, including a coefficient (maximum gain of FIG. 7) in a damper on-state, a coefficient (minimum gain of FIG. 7) in a damper off-state, and a coefficient (medium gain between the maximum gain and the minimum gain) that indicates a half damper state.

Refer back to FIG. 4.

The filter 44 is a digital filter that performs filtering for imparting pitch variation according to physical resonance characteristic of each string to a resonant signal circulating in the resonator 41 corresponding to each string. The string resonance characteristic of the piano depends on its material, shape, dimensions, string tension, maintenance methods, etc.

The resonator 41 feeds the output of the delay 45 as a resonant signal that is waveform data indicating a musical sound generated by resonance of the corresponding string to the corresponding output multiplier 46. The delay amount of the delay 45, filter factor of the filter 44, and coefficient of the multiplier 43 are stored in the ROM 12 as the string resonance parameters in the tone color data.

The output multiplier 46 includes 93 multipliers respectively corresponding to 93 output destinations. Each output multiplier 46 multiplies the resonant signal output from the resonator 41, which corresponds to the waveform data processed by the delay 45, by an output coefficient that is set in advance according to the influence of vibration of the corresponding string on vibration of each output destination and that is stored in the ROM 2 as a string resonance parameter. The output destinations include five inputs (namely, five outputs from a resonator corresponding to an n-th string are RSnd1 to RSnd5) corresponding to the five points (excitation points) on the bridges in the sound board simulator 50, and 88 inputs (namely, 88 outputs from the resonator corresponding to the n-th string are Sn-1 to Sn-88) of resonance input mixers corresponding to each string (resonator).

Coefficients to be set to the multipliers included in the output multiplier 46 are determined in advance considering the aforementioned description with respect to the multiplier 35, and are stored in the ROM 12. However, the coefficients need not be equal to those set to the multiplier 35.

For the string corresponding to the resonator 41, the coefficient is set to 0 (−∞ dB which means that sound is not output) since the output of the delay 45 is doubled when it is added to the input of the resonator 41 by the adder 42 and input again to the resonator 41 through the output multiplier 46 and the resonance input mixers. A loop may be configured with a path through which the output of the delay 45 is input to the resonator 41 through the output multiplier 46 and the resonance input mixers without using the adder 42. In this case, the coefficient can be set to 1 (0 dB which means that a level is not changed)

The coefficient depends on the pitch corresponding to the resonator 41. Prior to generation of a musical sound in the musical sound signal generation apparatus 10, the CPU 11 sets each coefficient included in the string resonance parameters of the tone color data to each multiplier included in the output multiplier 46.

The resonance input mixer IMgn corresponding to the n-th string mixes a string signal (signal SSgn input to the resonator corresponding to the n-th string from the string output mixer OMgn) output from the string signal generator 30 to the resonator 41-*n* and resonant signals (signals S1-*n* to S88-*n*) output to the resonator 41 from among the 88 resonators 41 via the output multiplier 46, and applies the mixed signal to the corresponding resonator 41-*n*.

Accordingly, the resonator 41 accepts not only a string signal generated by the corresponding string when the string is struck by a hammer but also a resonant signal of a string that resonates due to the vibration of the struck string, and a resonant signal circulating in the resonator 41 is generated according to the energy of the signals input to the resonator 41. Furthermore, it is possible to generate an appropriate resonant signal based on the physical structure of the piano because how much a string signal of each string and a resonant signal of each string are input to the resonator 41 can be determined by coefficients (the coefficient of the multiplier 35 and the coefficient of the output multiplier 46) that reflect the physical structure of the piano.

Namely, the string resonance simulator 40 controls level of each resonant signal with a plurality of first output coefficients to generate a plurality of level-controlled resonant signals corresponding to the pitches and outputs the plurality of level-controlled resonant signals to the supply section in the form of the resonance input mixers IMg1-IMg88, and the supply section mixes the plurality of level-controlled signals corresponding to the pitches with the string signals from the string signal generator 30 to generate the plurality of loop input signals corresponding to the pitches.

As shown in FIG. 5, the string resonance simulator 40 includes five resonance output mixers OMrd corresponding to five excitation points of the sound board simulator 50. The resonance output mixer OMrdn corresponding to the n-th excitation point n mixes resonant signals RS1*dn* to RS88*dn* output from the 88 output multipliers 46 corresponding to the 88 resonators 41 to the excitation point n and supplies the composite resonant signal RSdn to the sound board simulator 50.

Figure 8:
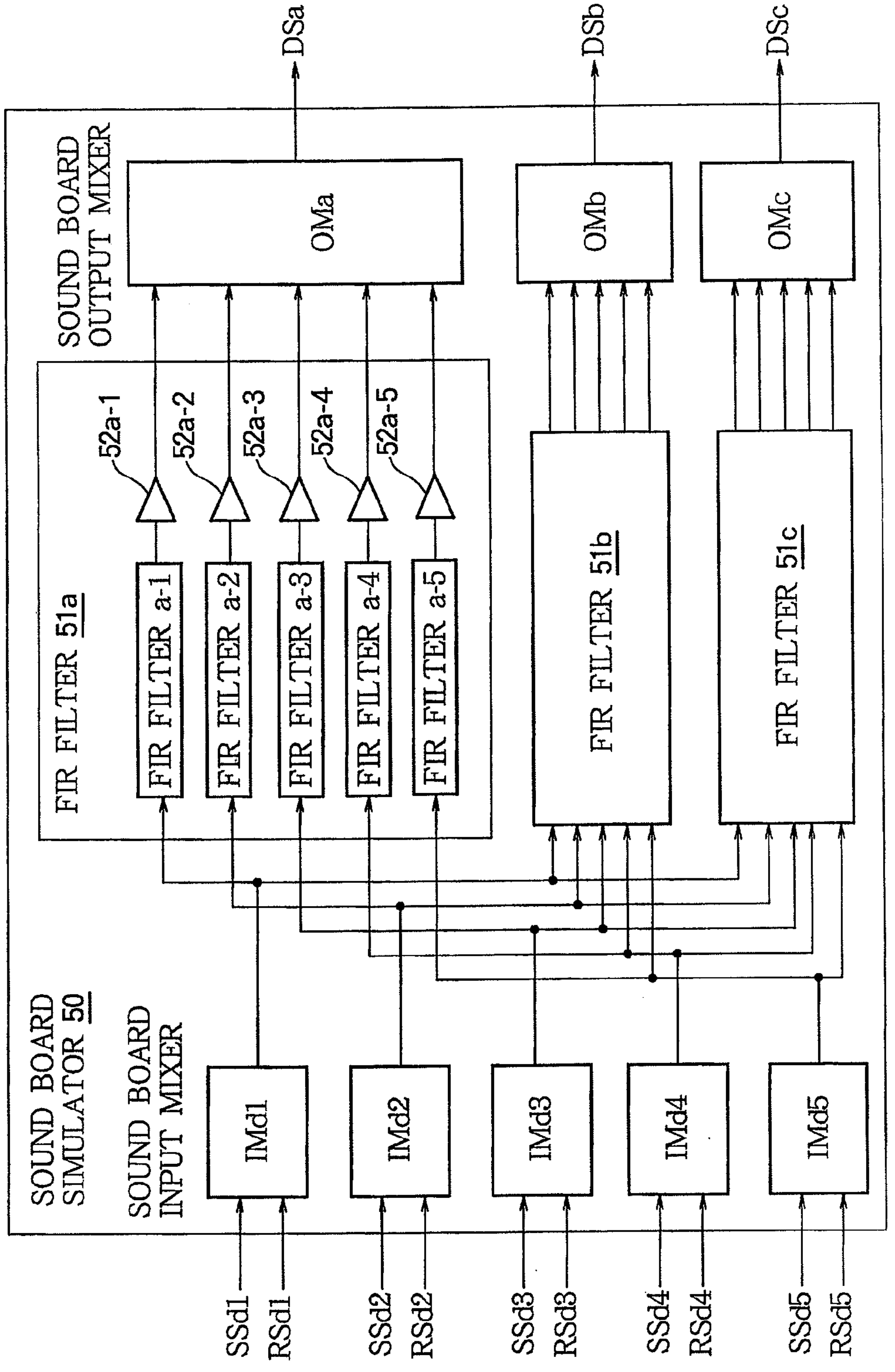
FIG. 8 illustrates a configuration of a sound board simulator shown in FIG. 1.

FIG. 8 illustrates the configuration of the sound board simulator 50.

As shown in FIG. 8, the sound board simulator 50 includes sound board input mixers IMd1 to IMd5, finite impulse response (FIR) filters 51*a*, 51*b* and 51*c*, and sound board output mixers OMa, OMb and OMc.

The sound board input mixers IMd1 to IMd5, which are configured to correspond to the five points (excitation points of the sound board) on the bridges, mix a string signal generated by the string signal generator 30 and a resonant signal generated by the string resonance simulator 40 for each point and supply the mixed signal to the FIR filters 51*a*, 51*b* and 51*c* as an input signal at each point.

The FIR filters 51*a*, 51*b* and 51*c* reproduce variation of musical sound characteristics of each sound signal when vibration is propagated from the representative five points (excitation points) involved in excitation of the sound board to the three representative points (sound-discharging points) involved in sound discharge from the vibrating sound board.

Namely, the output section further includes a sound board simulator 50 that imparts a sound board effect to the musical sound signal to generate a musical sound signal with the sound board effect.

As described above, the string signal generator 30 controls level of the string signal with a second distribution coefficient, and distributes the level-controlled string signal to the output section. The string resonance simulator 40 controls level of each of the resonant signals with a second output coefficient and outputs the level-controlled resonant signals to the output section. The output section mixes the string signal from the string signal generator and the resonant signals from the string resonance simulator to generate the musical sound signal.

As described above, the output section generates n musical sound signals corresponding to n drive points (n is a integer and more than one). The string signal generator 30 controls level of the string signal with n second distribution coefficients, and distributes n level-controlled string signals corresponding to the n drive points to the output section. The string resonance simulator 40 controls level of each of the resonant signals with n second output coefficients and outputs n set of level-controlled resonant signals corresponding to the n drive points to the output section. The output section mixes the n string signals from the string signal generator and the n set of resonant signals from the string resonance simulator to generate n musical sound signals corresponding to n drive points.

Further, the output section includes a sound board simulator 50 that imparts a sound board effect to the n musical sound signals to generate m musical sounds with the sound board effect (m is a integer and more than one).

Figure 9:
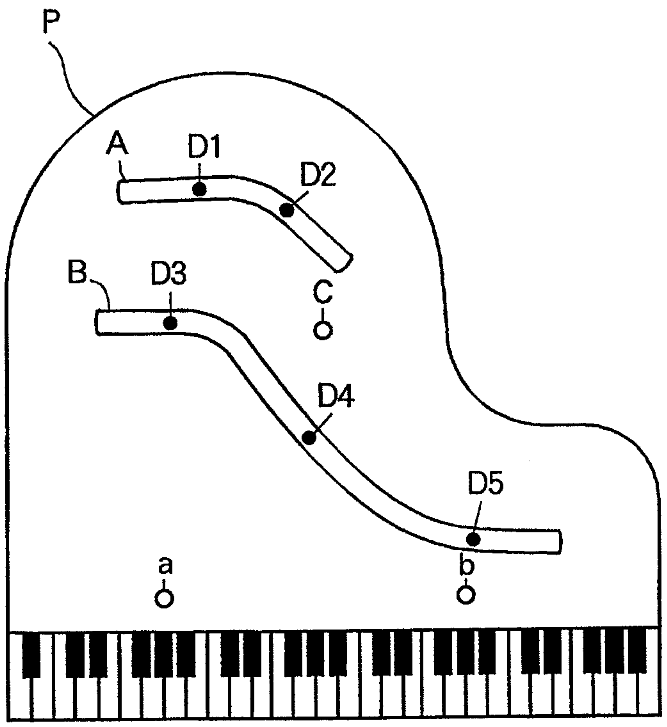
FIG. 9 shows arrangement of representative points involved in reverberation in bridges and a sound board of a piano.

FIG. 9 illustrates arrangement of these points.

A piano P includes two bridges A and B. Strings (not shown) in a low range are fixed to the bridge A and strings (not shown) from a middle range (at the left in the figure) to a high range (at the right in the figure) are fixed to the bridge B. D1 to D5 represent the five representative excitation points that transmit a signal from a string to the sound board via the bridges to vibrate the sound board and a, b and c represent the three representative sound-discharging points that discharge the vibration of the sound board to the air as sound.

In a real piano, sound generation sources that generate sound impulses using D1 to D5 as driving points (excitation points) are installed and sound sensors having a, b and c as measurement points are set such that the sound generation sources D1 to D5 sequentially output sound impulses and the sound sensors sense impulses propagated in the sound board and arriving at a, b and c, to thereby obtain 15 response waveforms (impulse response) that indicate propagation characteristics of 15 paths with respect to 15 combinations of the driving points D1 to D5 and the measurement points a, b and c and store coefficients of the 15 corresponding sets in the ROM 12 as sound board parameters of the tone color data.

Five FIR filters included in each of the FIR filters 51*a*, 51*b* and 51*c* reproduce the propagation characteristics of the 15 paths using the coefficients of the 15 sets based on the 15 response waveforms stored in the ROM 12. For example, the FIR filters a-1 to a-5 included in the FIR filter 51*a* use coefficients of 5 sets based on 5 response waveforms measured for combinations of the driving points D1 to D5 and the measurement point a and impart a musical sound characteristic variation corresponding to reverberation of the sound board to 5 sound signals transmitted from the excitation points D1 through D5 to the sound-discharging point a. Here, variations in level and phase characteristics of each frequency band of a sound signal in each path are reproduced in reality.

The FIR filters 51*a*, 51*b* and 51*c* include multipliers 52 each of which multiplies the output of each FIR filter by a coefficient stored as one of the sound board parameters from among the tone color data. This coefficient controls the amount of propagation of sound signals along the paths from the five excitation points D1 through D5 to the three sound-discharging points a, b and c.

The sound board output mixers OMa, OMb and OMc, which are configured to correspond to the sound-discharging points a, b and c, mix output signals of the multipliers 52, whose characteristics and levels have been controlled, as data of a sound signal propagated from each of the excitation points D1 through D5 to each of the sound-discharging points a, b and c and output the resulting signal for each sound-discharging point.

It is possible to generate waveform data by imparting resonance effects of the sound board to waveform data indicating a musical sound caused by vibration of the sound board including resonance according to the sound board simulator 50. In addition, output signals DSa, DSb and DSc of the sound board simulator 50 are supplied to the sound system 18 via the DAC 17, as described above, and are used to generate sound. The 3-channel speakers of the sound system 18 are arranged in positions corresponding to the locations of the measurement points a, b and c (sound-discharging points a, b and c) in a case of a real piano, which are used to obtain parameters of FIR filters of a keyboard type electronic musical instrument (electric piano) equipped with the musical sound signal generation apparatus.

There is an electric piano having a depth shorter than that of an acoustic grand piano even when it is designed in the form of a grand piano. In this case, distances between a performer and speakers are desirably decreased in response to a depth ratio of the electric piano to the real piano.

Furthermore, it is desirable that the housing of the electric piano functions as a speaker box and has a flat frequency characteristic since resonant sound of the sound board, which will be added to a musical sound of the piano, is included in the output signals DSa, DSb and DSc of the sound board simulator 50.

A description will be given of a process executed by the CPU 11 when various events are generated in the musical sound signal generation apparatus 10 with reference to FIGS. 10 to 13.

Prior to the description, the CPU 11 is a controller that sets coefficients to the string resonance simulator 40 on the basis of the string resonance parameters included in the tone color data and sets coefficients to the sound board simulator 50 on the basis of the sound board parameters included in the tone color data. At this time, a value $C_{closed}$(n) corresponding to a case in which the n-th string is damped from among the string resonance parameters included in the tone color data is initially set as the coefficient c(n) of the multiplier 43-*n* to the resonator 41-*n* corresponding to the string n having a note number smaller than $DK_{max}$ among the plurality of resonators 41 of the string resonance simulator 40, and thus any resonator 41 cannot easily resonate. Conversely, since a value $C_{open}$(n) corresponding to a case in which the n-th string is not damped is initially set as the coefficient c(n) of the multiplier 43-*n* to the resonator 41-*n* corresponding to the string n having a note number larger than $DK_{max}$, all the resonators 41 can easily resonate.

Figure 10:
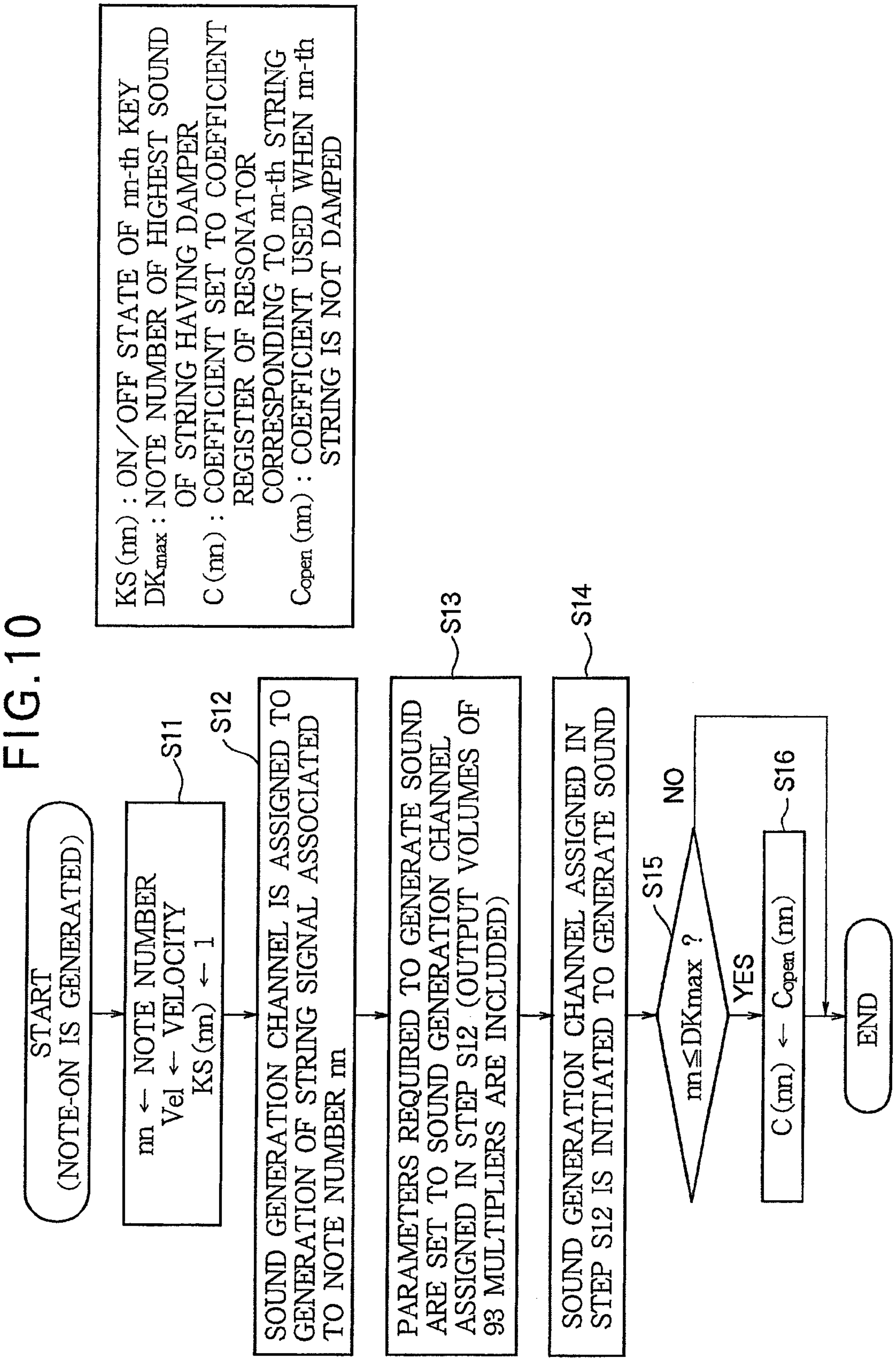
FIG. 10 is a flowchart illustrating a process executed by a CPU when a note-on event is generated in the musical sound signal generation apparatus shown in FIG. 1.

FIG. 10 is a flowchart illustrating a process performed when a note-on event is generated.

Upon detection of a note-on event, the CPU 11 initiates the process of the flowchart shown in FIG. 10.

A note number and a velocity imparted to the detected note-on event are set to registers nn and vel. Here, note numbers are assigned such that the first key of a piano having 88 keys is set to '1' and the eighty-eighth key is set to '88'. These note numbers are shifted from note numbers ('20' to '108' are allocated to keys) of an MIDI system by 20. The velocity is a value included in the note-on event. In addition, '1' which indicates ON is set to KS(nn) which represents the on/off state of an nn-th key (S11).

An unused channel among the sound generation channels 31 of the string signal generator 30 is allocated to generation of a string signal associated to note number nn (S12). Here, only one sound generation channel is allocated to generation of sound of one pitch and when it is necessary to generate sound of a pitch while the sound of the same pitch is being generated, the sound generation channel 31 that is generating the sound is rapidly damped and, simultaneously, a different sound generation channel is assigned for the subsequent generation of sound.

When generated sound is sufficiently damped to the point of being muted in a certain sound generation channel, this sound generation channel is opened to become an 'unused' sound generation channel.

Upon the completion of assignment in step S12, parameters required for generation of sound are set to the assigned sound generation channel on the basis of the tone color data (S13). The parameters include a parameter that specifies waveform data of one string sound to be read from the waveform memory 19 by the waveform reader 32, a parameter (so-called 'F number') that indicates a pitch shift of the waveform data, a filter factor (which may be time-variant) used for filtering in the signal processor 33, a volume level (depending on velocity) of the initial stage (from an attack state to a decay state) of the amplitude envelope in the envelop processor 34, a decay rate in a release state, and 93 coefficients of the 93 multipliers 35.

Then, the sound generation channel allocated in step S12 is instructed to initiate generation of sound (S14).

If $nn \leq DK_{max}$, that is, if the note-on event relates to a key equipped with a damper (e.g., a key corresponding to a note number smaller than note number '68' (pianos have different numbers of keys equipped with dampers)) (S15), a coefficient C(nn) imparted to a multiplier 43-*nn* of a resonator 41-*nn* corresponding to the nn-th string (of a register 48) is set to the value $C_{open}$(nn) corresponding to a case in which the nn-th string is not damped from among the string resonance parameters (S16) since the damper is released according to key depression, and then the process is ended. If nn>$DK_{max}$ in step S15, the process is ended since the damper state is not changed even if the key is depressed.

According to the aforementioned process, it is possible to initiate generation of a string signal of a string corresponding to a depressed key in response to key depression (note-on instruction) and, simultaneously, to change the resonator 41 corresponding to the string from which the damper is released according to the key depression to a state in which the resonator 41 can easily resonate.

Figure 11:
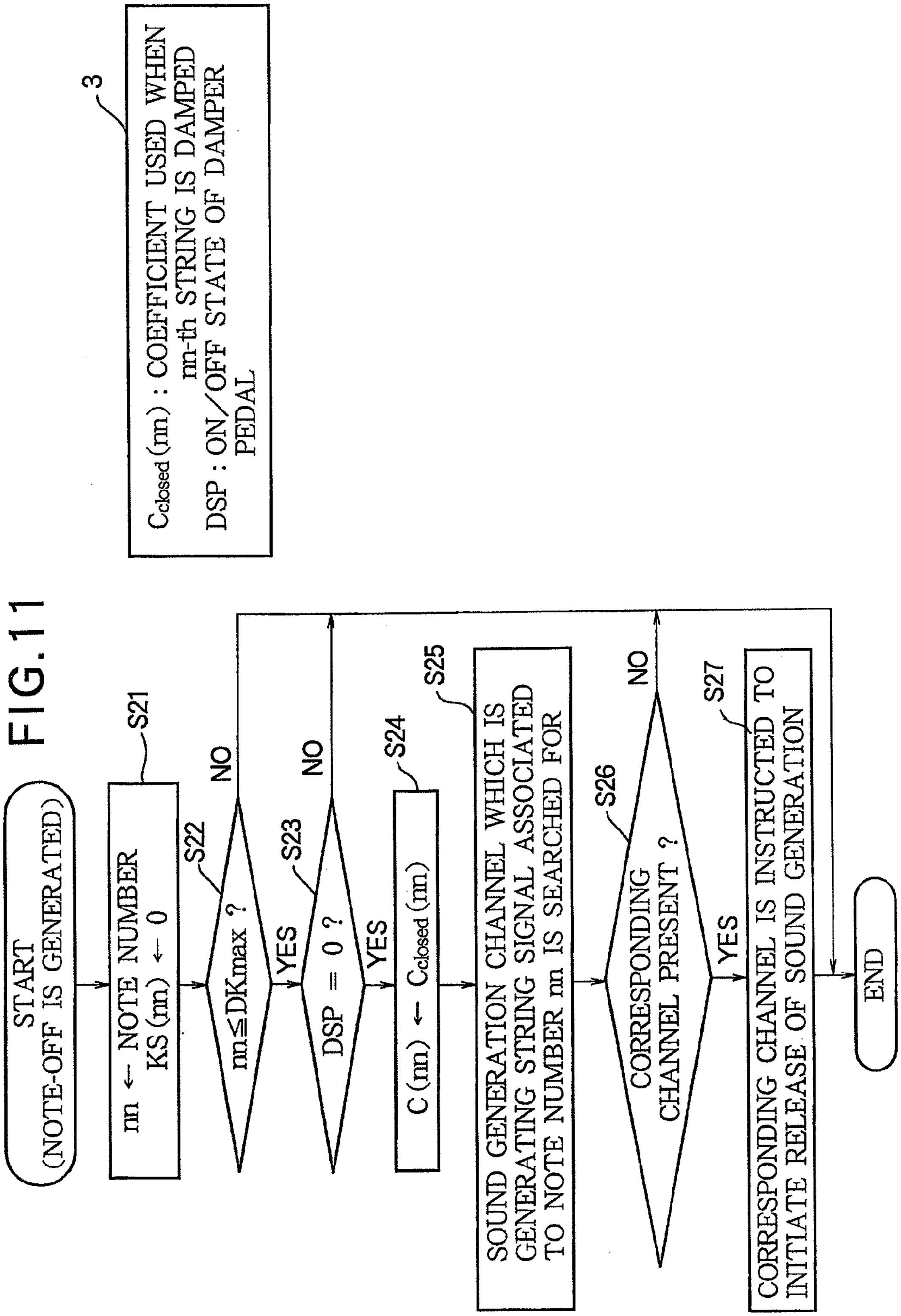
FIG. 11 is a flowchart illustrating a process executed by the CPU when a note-off event is generated in the musical sound signal generation apparatus shown in FIG. 1.

FIG. 11 is a flowchart illustrating a process when a note-off event is generated.

Upon detection of a note-off event, the CPU 11 initiates the process of the flowchart shown in FIG. 11.

First, the CPU 11 sets a note number imparted to the detected note-off event to the register nn and, simultaneously, sets the register KS(nn), which indicates the on/off state of the nn-th key, to '0' that represents OFF (S21).

Subsequently, If nn≤$DK_{max}$ and DPS=0, that is, if the note-off event relates to a string equipped with a damper and the damper pedal is in an off-state (S22 and S23), the coefficient C(nn) imparted to the multiplier 43-*nn* of the resonator 41-*nn* corresponding to the nn-th string is set to the value $C_{closed}$(nn) corresponding to a case in which the nn-th string is damped from among the string resonance parameters since the damper depresses the string according to key release (S24).

Then, a sound generation channel 31 that is generating sound of a string signal associated to the note number nn is searched for (S25) and when the sound generation channel 31 is present (S26), the sound generation channel 31 is instructed to initiate release of sound generation (S27) and the process is ended.

According to the release instruction, the sound generation channel instructed to initiate release is set to 'release state' in the string signal generator 30, and the volume envelope of the sound generation channel starts to be damped at a rate corresponding to the difference between the release rate and the decay rate. As a result, the volume of each piece of waveform data of the string sound of the sound generation channel, output from the string signal generator 30, is damped at the corresponding release rate.

When the note-off event relates to a string having no damper (having a pitch higher than a predetermined pitch), or the damper pedal is in an on-state in step S22 or S23, the process is ended since the damper state is not changed even if the key is released and the string is not damped. In this case, a release instruction is not necessary because damping of string vibration is performed according to a damping curve.

According to the aforementioned process, it is possible to generate a string signal of a string corresponding to a released key in the string signal generator 30 in a release state and, simultaneously, to change the resonator 41 corresponding to the string such that the resonator 41 cannot easily resonate on condition that the damper pedal is off in response to key release (note-off instruction).

The processes illustrated in FIGS. 10 and 11 can be performed even when a plurality of keys are simultaneously depressed or released.

Figure 12:
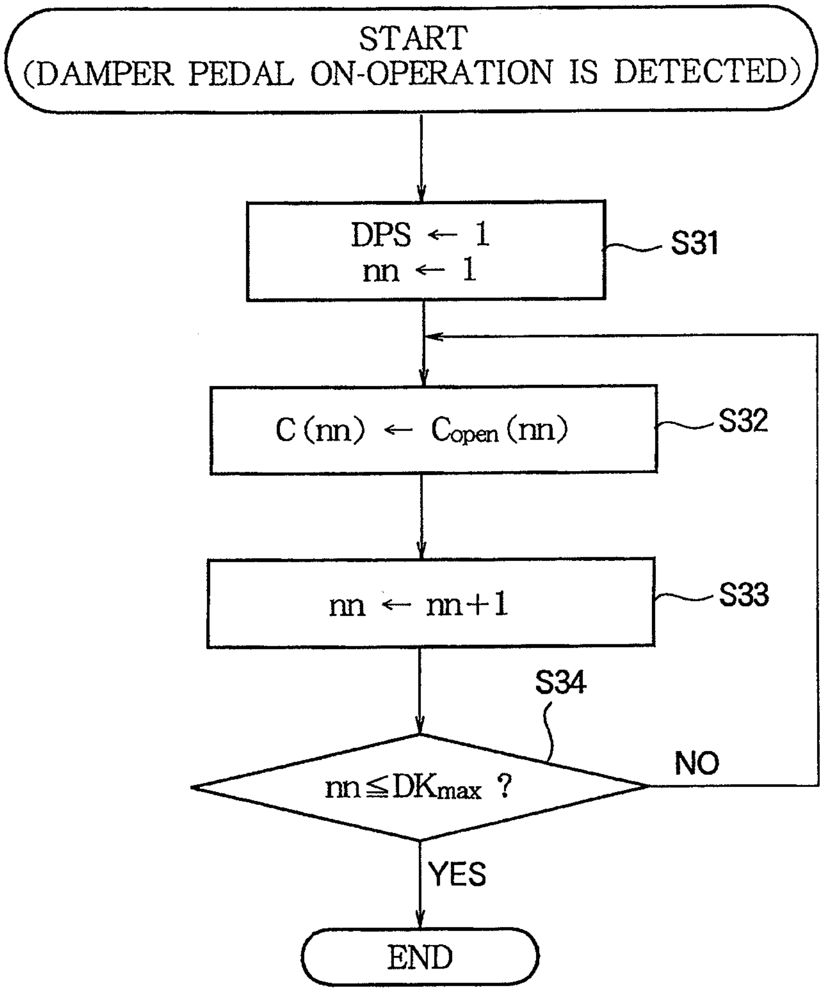
FIG. 12 is a flowchart illustrating a process executed by the CPU when a damper pedal is on in the musical sound signal generation apparatus shown in FIG. 1.

FIG. 12 is a flowchart illustrating a process when a damper pedal is on.

Upon detection of a damper pedal on event, the CPU 11 initiates the process of the flowchart shown in FIG. 12.

First of all, the CPU 11 sets '1' indicating an on-state to the register DSP that represents on/off state of the damper pedal and, simultaneously, sequentially executes step S32 while increasing nn from 1 to $DK_{max}$ (S31, S33 and S34). Specifically, the coefficient C(nn) imparted to the coefficient register 48 of the resonator 41 is set to the value $C_{open}$(nn) used when the nn-th string is not damped for each string from which the damper is released according to damper pedal on manipulation. Then, the process is ended.

According to the above-mentioned process, it is possible to change the resonator 41 corresponding to a string with a damper to a state in which the resonator 41 can easily resonate in response to a damper-pedal-on instruction. In the process illustrated in FIG. 12, it is possible to search for sound generation channels that are generating sounds in the string signal generator 30 for a sound generation channel in the 'release state', instruct the located sound generation channel to stop release, cancel the 'release state' of the sound generation channel, and change the sound generation channel to the 'attack state' or 'decay state'.

Figure 13:
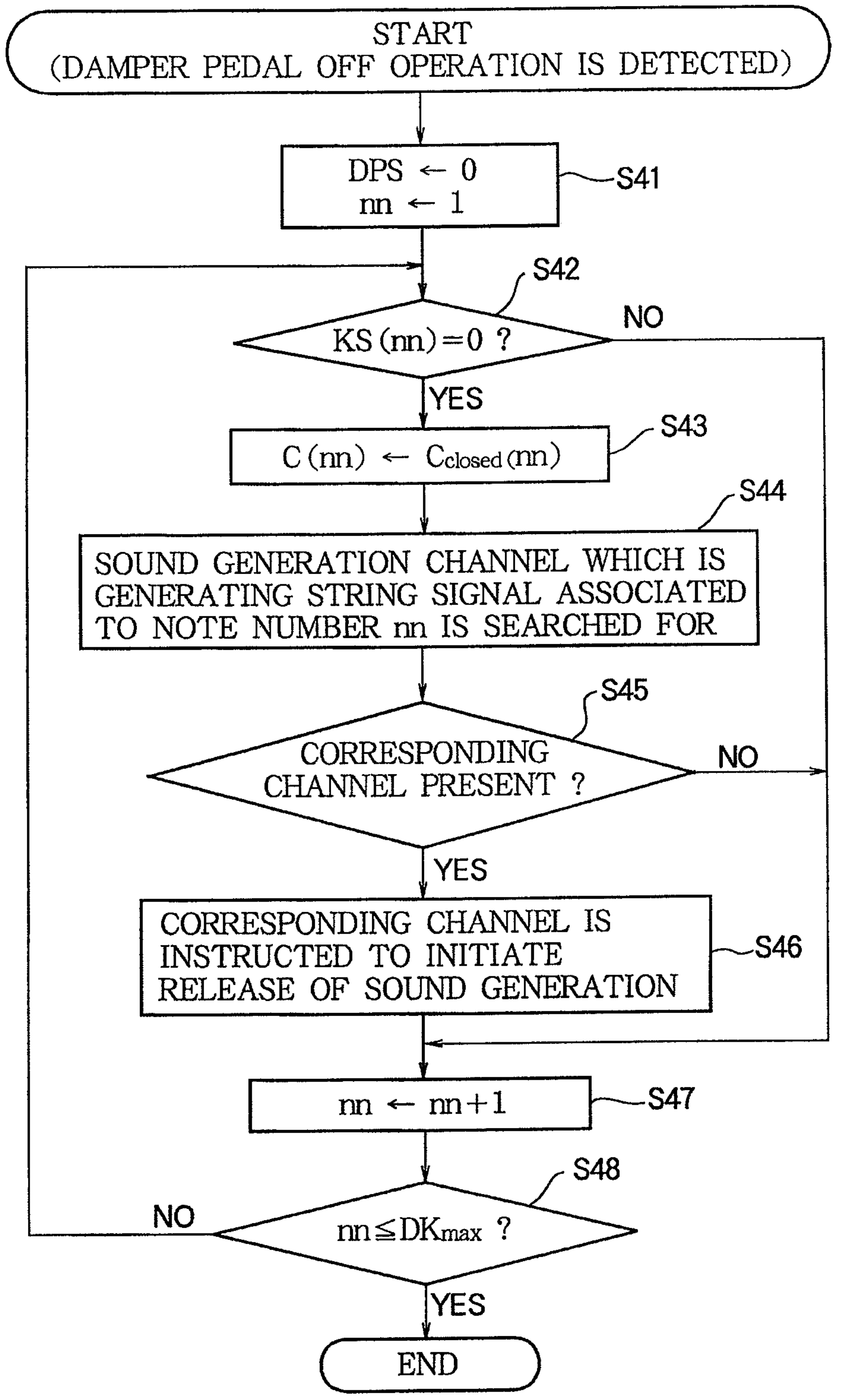
FIG. 13 is a flowchart illustrating a process executed by the CPU when the damper pedal is off in the musical sound signal generation apparatus shown in FIG. 1.

FIG. 13 is a flowchart illustrating a process when the damper pedal is off.

Upon detection of a damper pedal off event, the CPU 11 initiates the process of the flowchart illustrated in FIG. 13.

First, the CPU 11 sets '0' indicating OFF to the register DPS that represents the on/off state of the damper pedal and, simultaneously, sequentially performs steps S42 to S46 on values of nn while increasing nn from 1 to $DK_{max}$ (S41, S47 and S48).

Specifically, the CPU 11 determines whether a key corresponding to note number nn is depressed or not (S42). If the key is not depressed (if KS(nn)=0), the corresponding damper depresses the corresponding string according to a damper pedal off operation, and thus the coefficient c(nn) imparted to the multiplier 43-*nn* of the resonator 41-*nn* is set to the value $C_{closed}$(nn) used when the nn-th string is damped from among the resonator parameters (S43).

The CPU 11 searches for a sound generation channel 31 that is generating sound of the string signal associated to the note number nn (S44) and when the corresponding channel is present (S45), instructs the channel to initiate release (s46). This release corresponds to that set in step S27 of FIG. 11 when the damper depresses the string when the key is released. If the result of step S42 is NO, the damper does not depress the string and the damper state is not changed even when the damper pedal is off, and thus no special operation is performed. Then, the process is ended.

According to the aforementioned process, it is possible to change the resonator 41 corresponding to a string that has a damper and is in a key release state such that the resonator 41 cannot easily resonate and, simultaneously, generate the string signal of the string in the string signal generator 30 in a release state.

While the embodiments have been described above, the configuration of the apparatus, the format of data used, and details of the processes are not limited thereto.

For example, although a string corresponding to a note number greater than $DK_{max}$ is not equipped with a damper in the aforementioned embodiments, musical sounds can be generated under the condition that all strings have dampers without discrimination according to note number. In addition, it is possible to reproduce sounds of strings having no damper without discrimination of strings having dampers from strings having no damper by setting $C_{open}$(nn) and $C_{closed}$(nn) to the same value for strings having no damper and setting a decay rate of the release state to the same value as the decay rate of the key depression state.

Furthermore, while two coefficients $C_{open}$(nn) and $C_{closed}$(nn) are set to the coefficient register 48 in the above-mentioned embodiments, the coefficients may be set such that a half damper operation can be detected and an intermediate coefficient corresponding to the half damper operation can be set when the half damper operation is detected. Moreover, it is possible to set different coefficients in a key depression state and a key release state even when damping occurs in the same manner in the two states (however, an undamped state should be set to a coefficient corresponding to decay time longer than that of the coefficient set to a damped state).

In addition, it is unnecessary to set $C_{open}$(nn) and $C_{closed}$(nn) to different values for all strings and they can be set to the same value for some of the strings.

The parameters of the tone color data can be edited (changed) by the user.

While simulation of propagation characteristics in the sound board simulator 50 has been described as being performed using the five points on the bridges and three points on the sound board in the above-described embodiments, the number of the points is not limited thereto.

While the algorithm that models the physical resonance structure of the piano has been described in the aforementioned embodiments, any musical instrument can be modeled in the same manner by appropriately setting parameters of components including the multiplier 35, output multiplier 46 and FIR filter 51 so long as the musical instrument has a structure of propagating vibration to a plurality of fixed strings to resonate the same.

It is possible to use tone color data, obtained by sampling string vibration sound, measuring a response waveform for obtaining FIR filter parameters and determining coefficients set to the string resonance simulator using a piano of an arbitrary piano maker, a piano having an arbitrary structure, conventional forte piano, and pianos having a damper pedal, to generate a musical sound. In addition, the present invention can be applied to generation of a musical sound of a musical instrument such as a chambelo which has a damper but no damper pedal if control relating to the damper pedal is omitted.

When sound board arrangements are largely different from each other as in a grand piano and an upright piano, for example, it is difficult to arrange a pair of speakers (e.g., 3-channel speakers) suitably to generate musical sounds in both the grand piano and the upright piano since locations of sound-discharging points in the two pianos are significantly different from each other. However, if a sound system is used, which is configured to allow a user to recognize that a sound is discharged from a virtual point by overlapping transfer characteristics using a speaker array, it is possible to generate musical sounds of the pianos having largely different sound-discharge locations, as described above, using one electric musical instrument equipped with the musical sound signal generating apparatus. In this case, generation of sound from the speaker array is controlled such that a sound-discharging point recognized by the user is varied according to used tone color data.

Furthermore, the above-mentioned modifications including the descriptions of the embodiments can be arbitrarily combined and applied without departing from the spirit and scope of the present invention.

As can be understood from the above description, the musical sound signal generating apparatus according to the present invention can impart the same resonance effect as the string resonance effect based on the physical structure of an acoustic piano to a string signal generated by a sound source on the basis of a note-on instruction, a note-off instruction, a damper pedal on-state and a damper pedal off-state.

Essentially, the inventive musical sound signal generation apparatus is composed of a sound generation instruction section, a string signal generator 30, a string resonance simulator 40, and an output section. The sound generation instruction section 30 supplies a note-on instruction for generating a musical sound signal at a specified pitch among a plurality of pitches. The string signal generator 30 generates a first string signal (SSd1-SSd5) representing vibration of a string corresponding to the specified pitch in response to the note-on instruction, and generates a plurality of second string signals (SSg1-SSg88) representing vibrations of strings corresponding to the plurality of pitches in response to the note-on instruction. The string resonance simulator 40 is equipped with a plurality of loop circuits (41-1, 42-1, . . . , 41-88) corresponding to the plurality of pitches, each loop circuit (41-1) looping the second string signal (SSg1) having the pitch corresponding to the loop circuit (41-1) to generate a resonance signal and feeding a plurality of first resonance signals (s1-1, S1-2, . . . , S1-88) based on the resonance signal for the plurality of loop circuits (41-1, 42-1, . . . , 41-88), each loop circuit (41-1) further looping a plurality of the first resonance signals (S1-1, S2-1, . . . , S88-1) having the corresponding pitch and being fed back from the plurality of loop circuits (41-1, 42-1, . . . , 41-88) to generate a second resonance signal (RS**1*d*1-RS1*d*5). The output section generates the musical sound signal based on the first string signal (SSd1-SSd5) generated by the string signal generator and a plurality of the second resonance signals (RS1*d*1-RS1*d*5, RS2*d*1-RS2*d*5, . . . , RS88*d*1-RS88*d*5) generated by the plurality of loop circuits (41-1, 41-2, . . . , 41-88**).

Therefore, a musical sound signal generating apparatus capable of generating more realistic musical sounds can be implemented using the present invention.

What is claimed is:

1. A musical sound signal generation apparatus comprising:

a sound generation instruction section that supplies a note-on instruction of a pitch for instructing to start generation of a new musical sound signal at the pitch among a plurality of pitches and a note-off instruction of a pitch for instructing to accelerate decay of a musical sound signal, already generated at the pitch in response to a note-on instruction;

a damper state instruction section that provides a damper-pedal-on instruction indicating an on-state of a damper pedal and a damper-pedal-off instruction indicating an off-state of the damper pedal;

a string signal generator that generates a string signal corresponding to a string vibration of the pitch in response to the note-on instruction of the pitch such that amplitude of the string signal rises, then decays, and further decaying of the string signal is accelerated in response to the note-off instruction in case that the damper pedal is in the off-state, the string signal generator distributing the generated string signal in the form of a first plurality of string signals corresponding to the plurality of pitches and one or more output string signals;

a string resonance simulator including a plurality of loop circuits corresponding to the plurality of pitches and through which resonant signals of the corresponding pitches circulate, each loop circuit comprising a delay element for delaying the resonant signal by a delay time for the corresponding pitch, and an attenuation element for variably attenuating the resonant signal according to an attenuation coefficient;

a supply section that mixes the first plurality of string signals distributed from the string signal generator and a first plurality of resonant signals output from the string resonance simulator to generate a plurality of loop input signals and supplies the plurality of loop input signals to the plurality of loop circuits;

an output section that generates the new musical sound signal based on a second plurality of resonant signals output from the string resonance simulator and the one or more output string signals distributed from the string signal generator; and a controller that generates attenuation coefficients corresponding to the plurality of loop circuits, based on the note-on instruction, the note-off instruction, the damper-pedal-on instruction, and the damper-pedal-off instruction, and provides the attenuation coefficients to the attenuating elements in the corresponding loop circuits.

2. The musical sound signal generation apparatus according to claim 1, wherein the controller provides a first attenuation coefficient corresponding to a decay time of an undamped string sound to the attenuation element of the loop circuit of a pitch in response to the note-on instruction of the pitch, and then provides a second attenuation coefficient corresponding to a decay time of a damped string sound to the attenuation element of the loop circuit of a pitch in response to the note-off instruction of the pitch in case that the damper pedal is in the off-state, and otherwise provides the first attenuation coefficient to the attenuation element of the loop circuit of a pitch in response to the note-off instruction of the pitch in case that the damper pedal is in the on-state.

3. The musical sound signal generation apparatus according to claim 1, wherein the controller provides a first attenuation coefficient corresponding to a decay time of an undamped string sound to the attenuation element of the loop circuit of a pitch in response to the note-on instruction of the pitch, and then provides a second attenuation coefficient corresponding to a decay time of a damped string sound to the attenuation element of the loop circuit of a pitch in response to the note-off instruction of the pitch in case that the pitch is not higher than a predetermined pitch and the damper pedal is in the off-state, and otherwise provides the first attenuation coefficient to the attenuation element of the loop circuit of the pitch in response to the note-off instruction in case that the pitch is higher than the predetermined pitch or the damper pedal is in the on-state.

4. The musical sound signal generation apparatus according to claim 1, wherein the output section further includes a sound board simulator that imparts a sound board effect to the new musical sound signal to generate a musical sound signal with the sound board effect.

5. The musical sound signal generation apparatus according to claim 1, wherein the string signal generator comprises a waveform memory that stores a plurality of waveforms, a waveform reader that reads out a waveform corresponding to a pitch from the waveform memory in response to the note-on instruction of the pitch, and a processor that controls at least one of a frequency characteristic and an amplitude characteristic of the read waveform according to the note-on instruction and the note-off instruction of the pitch to generate the string signal.

6. The musical sound signal generation apparatus according to claim 5, wherein the string signal generator controls level of the generated string signal with a plurality of first distribution coefficients to generate the first plurality of string signals corresponding to the plurality of pitches, and distributes the first plurality of string signals to the supply section.

7. The musical sound signal generation apparatus according to claim 5, wherein the string resonance simulator controls level of a resonant signal with a plurality of first output coefficients to generate a plurality of level-controlled resonant signals corresponding to the pitches and outputs the plurality of level-controlled resonant signals to the supply section as included among the first plurality of resonant signals output from the string resonance simulator.

8. The musical sound signal generation apparatus according to claim 5, wherein the string signal generator controls level of the generated string signal with a second distribution coefficient, and distributes the level-controlled string signal to the output section as the one or more output string signals, wherein the string resonance simulator controls level of a resonant signal with a second output coefficient and outputs the level-controlled resonant signal to the output section as included among the second plurality of resonant signals output from the string resonance simulator.

9. The musical sound signal generation apparatus according to claim 5, wherein the output section generates n musical sound signals corresponding to n drive points, wherein n is an integer and more than one, wherein the string signal generator controls level of the generated string signal with n second distribution coefficients, and distributes n level-controlled string signals corresponding to the n drive points to the output section, the one or more output string signals included among the n level-controlled string signals, wherein the string resonance simulator controls level of a resonant signal with n second output coefficients and outputs n level-controlled resonant signals corresponding to the n drive points to the output section, the n level-controlled resonant signals included among the second plurality of resonant signals output from the string resonance simulator, and wherein the output section mixes the n level-controlled string signals from the string signal generator and the n level-controlled resonant signals from the string resonance simulator to generate the n musical sound signals corresponding to n drive points.

10. The musical sound signal generation apparatus according to claim 9, wherein the output section further includes a sound board simulator that imparts a sound board effect to the n musical sound signals to generate m musical sounds with the sound board effect, wherein m is an integer and more than one.

11. The musical sound signal generation apparatus according to claim 1, wherein the controller smoothly changes the attenuation coefficient to avoid noise when the damper pedal switches between the on-state and the off-state.

12. A musical sound signal generation apparatus comprising:

a sound generation instruction section that supplies a note-on instruction for generating a musical sound signal at a specified pitch among a plurality of pitches;

a string signal generator that generates a first string signal representing vibration of a string corresponding to the specified pitch in response to the note-on instruction, and that generates a plurality of second string signals representing vibrations of strings corresponding to the plurality of pitches in response to the note-on instruction;

a string resonance simulator including a plurality of loop circuits corresponding to the plurality of pitches, each loop circuit looping the second string signal having the pitch corresponding to the loop circuit to generate a resonance signal and feeding a plurality of first resonance signals based on the resonance signal for the plurality of loop circuits, each loop circuit further looping a plurality among the first resonance signals being fed back from the plurality of loop circuits to generate a second resonance signal; and an output section that generates the musical sound signal based on the first string signal generated by the string signal generator and a plurality of the second resonance signals generated by the plurality of loop circuits.

13. A musical sound signal generation method comprising:

supplying a note-on instruction of a pitch for instructing to start generation of a new musical sound signal at the pitch among a plurality of pitches and a note-off instruction of a pitch for instructing to accelerate decay of a musical sound signal, already generated at the pitch in response to a note-on instruction;

providing a damper-pedal-on instruction indicating an on-state of a damper pedal and a damper-pedal-off instruction indicating an off-state of the damper pedal;

generating a string signal corresponding to a string vibration of the pitch a string signal generator in response to the note-on instruction of the pitch such that amplitude of the string signal rises, then decays, and further decaying of the string signal is accelerated in response to the note-off instruction in case that the damper pedal is in the off-state;

distributing the generated string signal from the string signal generator in the form of a first plurality of string signals corresponding to the plurality of the pitches and one or more output string signals;

generating resonant signals by a plurality of loop circuits which correspond to the plurality of pitches and through which the resonant signals of the corresponding pitches circulate, each loop circuit comprising a delay element for delaying the resonant signal by a delay time for the corresponding pitch, and an attenuation element for variably attenuating the resonant signal according to an attenuation coefficient, the plurality of loop circuits included in a string resonance simulator;

mixing the first plurality of string signals distributed from the string signal generator and a first plurality of resonant signals output from the string resonance simulator to generate a plurality of loop input signals;

supplying the plurality of the loop input signals to the plurality of loop circuits;

generating the new musical sound signal based on a second plurality of resonant signals output from the string resonance simulator and the one or more output string signals plurality of the string signals distributed from the string signal generator;

generating attenuation coefficients corresponding to the plurality of loop circuits, based on the note-on instruction, the note-off instruction, the damper-pedal-on instruction, and the damper-pedal-off instruction; and providing the attenuation coefficients to the attenuating elements in the corresponding loop circuits.

14. A musical sound signal generation apparatus comprising:

a string signal generator that generates a string signal StrSig corresponding to a string vibration of a first string, the string signal generator distributing the generated string signal StrSig in the form of a string signal Sig1 and a string signal Sig2, wherein the string signal Sig1 and the string signal Sig2 are different from each other;

a string resonance simulator including:

a first resonator that corresponds to the first string; and a second resonator that corresponds to a second string and accepts the string signal Sig2, wherein the second resonator outputs a resonant signal ResSig2, wherein the first resonator accepts the string signal Sig1 and accepts an input signal InSig2-1 based on the resonant signal ResSig2, wherein the first resonator outputs a resonant signal ResSig1, which is generated according to energy of signals input to the first resonator, which include the string signal Sig1 and the input signal InSig2-1; and an output sound generator that generates a musical sound signal based on input signals including:

an input signal including a component based on the string signal StrSig from the string signal generator, an input signal based on the resonant signal ResSig1 from the first resonator, and an input signal based on the resonant signal ResSig2 from the second resonator.

15. A musical sound signal generation apparatus comprising:

a string signal generator that generates a string signal FSig representing vibration of a first string, and that generates a string signal SecSig1 and a string signal SecSig2 respectively representing vibrations of the first string and a second string;

a string resonance simulator including:

a first resonator that corresponds to the first string; and a second resonator that corresponds to the second string and accepts the string signal SecSig2, wherein the second resonator outputs a resonance signal SResSig2, wherein the first resonator accepts the string signal SecSig1 and accepts an input signal InSig2-1 based on the resonance signal SResSig2, wherein the first resonator outputs a resonance signal SResSig1, which is generated according to energy of signals input to the first resonator, which includes the string signal SecSig1 and the input signal InSig2-1; and an output sound generator that generates a musical sound signal based on input signals including:

the string signal FSig1 from the string signal generator, an input signal based on the resonance signal SResSig1 from the first resonator, and an input signal based on the resonance signal SResSig2 from the second resonator.

16. A musical sound signal generation method comprising:

generating a string signal StrSig corresponding to a string vibration of a first string;

distributing the string signal StrSig in the form of a string signal Sig1 to a first resonator that corresponds to the first string and a string signal Sig2 to a second resonator that corresponds to a second string, wherein the string signal Sig1 and the string signal Sig2 are different from each other;

accepting, by the second resonator, the string signal Sig2;

outputting, by the second resonator, a resonant signal ResSig2;

accepting, by the first resonator, the string signal Sig1 and an input signal InSig2-1, the input signal InSig2-1 based on the resonant signal ResSig2;

outputting, by the first resonator, a resonant signal ResSig1, which is generated according to energy of signals input to the first resonator, which include the string signal Sig1 and the input signal InSig2-1;

generating a musical sound signal based on input signals including:

an input signal including a component based on the string signal StrSig from the string signal generator, an input signal based on the resonant signal ResSig1 from the first resonator, and an input signal based on the resonant signal ResSig2 from the second resonator.

* * * * *